Aug. 13, 1968     H. DELORME     3,396,801
AIR PROPELLER

Filed June 30, 1966     2 Sheets-Sheet 1

INVENTOR
Hector DELORME
BY Pierre Lespérance
PATENT AGENT

Aug. 13, 1968  H. DELORME  3,396,801
AIR PROPELLER

Filed June 30, 1966  2 Sheets-Sheet 2

INVENTOR
Hector DELORME
BY
Pierre Lespérance
PATENT AGENT

United States Patent Office 3,396,801
Patented Aug. 13, 1968

3,396,801
AIR PROPELLER
Hector Delorme, 1 St. Paul St.,
Farnham, Quebec, Canada
Filed June 30, 1966, Ser. No. 561,860
6 Claims. (Cl. 170—170)

ABSTRACT OF THE DISCLOSURE

This invention concerns an improved air blowing system for use in spraying and dusting machines, the system comprising an axial air propeller carrying deflector plates at the ends of the propeller blades to assist in deflecting the air radially outwardly.

---

The present invention relates to a spraying and dusting machine in which a blast of air is generated and suitably deflected towards foliage that is to be sprayed or dusted, means being provided for feeding, spraying or dusting material to the air blast, the latter being formed as a ring of air ejected radially of the machine.

Machines of this type generally comprise a wheel-mounted cylindrical body housing an engine and a reservoir for the spraying or dusting material, a large diameter axial flow air fan co-axially mounted at the back end of the body and producing a forwardly directed axial flow of air, and air-deflecting means between the fan and the rear end of the body including baffles to deflect the air radially outwardly of the body at the top and sides thereof. Obviously, the stationary deflecting means produces a considerable loss of efficiency in the fan system and takes considerable room.

In known machines of this type, the cylindrical body is mounted on a chassis external to the body and itself carrying the ground-engaging wheels, resulting in a heavy and cumbersome machine.

Machines of this type often have to be replenished with water in an area far from a source of water under pressure, and known machines have no means for sucking water into the reservoir from a natural body of water.

The pump system of conventional machines often becomes unprimed and water has to be fetched to prime the pump after the machine has been left idle for some time. Known machines, which are pulled behind a tractor, require constant attention as to the conditions of its functioning and in such conventional machines, the operator has to climb down from his tractor to supervise the machine and to turn the spraying or dusting mechanism on or off, resulting in a loss of time.

Accordingly, the general object of the present invention resides in the provision of a machine of the type described, which will obviate the above-noted disadvantages, the main object being the provision of new air deflecting means for producing a radially directed air blast, said deflecting means being more efficient and taking much less room than the air-deflecting means of conventional machines.

Another object of the invention resides in the provision of a machine of the character described, which is devoid of any frame or chassis apart from the cylindrical body, the latter acting as its own chassis, whereby the overall dimensions of the machine are considerably diminished and the weight reduced.

Another object of the present invention resides in the provision of a machine of the character described, having an improved liquid circulating system which will keep the pump primed at all times, and which can be used to suck water to replenish the machine reservoir.

Another object of the invention resides in a machine of the character described, in which the operator, while seated on the towing tractor, can control the spraying or dusting system and can also see, while in said position, the dials indicating the conditions of operation of the machine.

The foregoing and other objects of the present invention will become more apparent during the following disclosure and by referring to the drawings, in which.

Figures 1, 2, 3, 4:
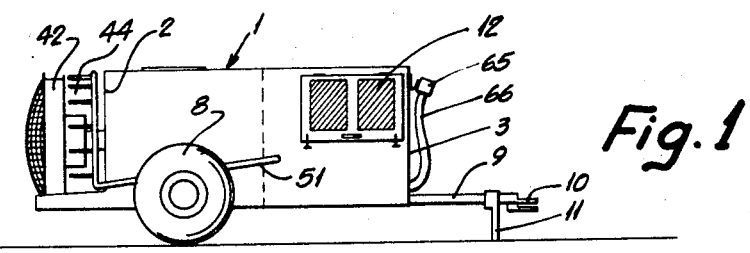
FIGURE 1 is a general side elevation of the spraying and dusting machine in accordance with the invention.
FIGURE 2 is a partial longitudinal section of the rear end portion of the machine.
FIGURE 3 is a partial perspective view of a blade of the propeller.
FIGURE 4 is a front elevation of the propeller assembly.

Referring now more particularly to the drawings in which like reference characters indicate like elements throughout, reference numeral 1 indicates a rigid cylindrical body having a back end wall 2 and a front end wall 3 approximately mid-way between the ends of the body. A partition 4 parallel to the end walls extends within the body and forms a fluid-tight liquid compartment or reservoir 5, in the back portion of body 1 and an engine compartment 6 in the front portion of body 1.

A tube 7 extends transversely through reservoir 5 and is secured to the cylindrical wall of body 1 and protrudes outwardly from the same at a level below the center line of the body 1. The body 1 is supported by pneumatic tire wheels 8, the shaft of which extends through and is journalled within tube 7.

A tow bar 9 protrudes from the front of body 1. Tow bar 9 is parallel with the long axis of body 1 and is secured flat against the inside surface of the cylindrical wall of body 1 at the lowermost portion thereof and extends through end wall 3. Tow bar 9 is provided at its outer end with the usual hitching means 10 for detachable connection to the back of a tractor to tow the machine of the present invenion. A pivotable retractable ground-engaging leg 11 is mounted at the front end portion of tow bar 9.

Engine compartment 6 has a screen door 12 for ventilating said compartment and another access door (not shown) for the engine and pumping system.

Figure 5:
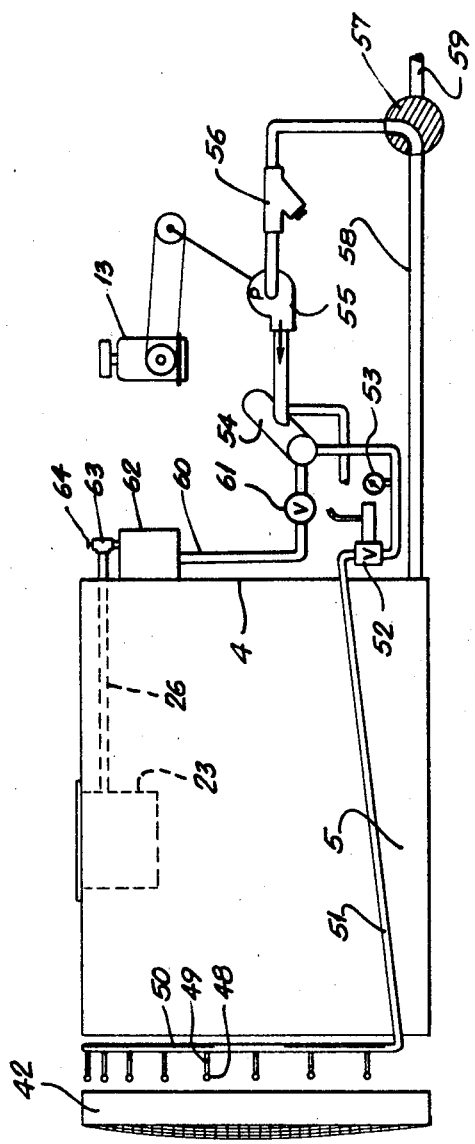
FIGURE 5 is a schematic view of the rear end portion of the machine and of the liquid circulating system.

The internal combustion engine is schematically indicated at 13 in FIGURE 5 and its crank shaft drives a transmission shaft composed of forward shaft section 14 and rear shaft section 15, interconnected by a universal joint 16.

The transmission shaft extends through a longitudinally disposed tube 17 passing through reservoir 5 and welded in a fluid-tight manner to the back end wall 2 and partition 4, tube 17 protruding rearwardly from end wall 2.

The rear transmission shaft section 15 is journalled within tube 17 by means of self-aligning bearings 18, while front section 14 is free in tube 17. Tube 17 is provided with an access opening 19 in the top thereof, which registers with universal joint 16, said opening 19 being normally closed in a fluid-tight manner by a cover 20.

Reservoir 5 has on the top thereof a filling opening 21 in register with opening 19 of tube 17. Opening 21 is normally closed in fluid-tight manner by a cover 22 hinged to body 1.

A screened basket 23 is removably inserted within opening 21 and suspended from the edge thereof into reservoir 5. Basket 23 serves to hold a quantity of insecticide material in powder form, such as shown at 24, or the like material to be sprayed on foliage to be treated.

Basket 23 is provided with a perforated sprayer pipe 25, which has a detachable connection with a water supply pipe 26 for wetting the powder material 24 in the basket 23 and entraining the same into the liquid within reservoir 5 for the eventual mixing of the powder in said liquid.

For further mixing, paddles 27, mounted on a shaft 28, are rotated by said shaft through the engine 13.

An air propeller 29 is keyed to the outer end of the transmission shaft back section 15. Air propeller 29 comprises a hub 30 and radially extending blades 31 having the desired pitch to generate an axial air flow moving forwardly with respect to the body 1, that is against the back end wall 2.

In accordance with the invention, each blade 31 carries near its tip 32 a deflector plate 33. Each deflector plate 33 protrudes from the trailing edge 34 of the blade 31 and extends transversely to the long axis of blade 31, that is in a plane substantially parallel to the axis of rotation of the air propeller 29, but is inclined radially inwardly in the direction of the leading edge 35 of the blade 31.

Each deflector plate 33 is reinforced by a web 36 which lies in a plane generally parallel to the plane of rotation of the air propeller 29 and extends from the outer straight edge 37 of the deflector plate 33 to the tip 32 of the blade 31. Thus, web 36 extends at substantially right angles to deflector plate 33 and meets with the latter along a line such that the portion of the deflector plate downstream from the web is wider than the portion of said deflector plate upstream from said web, with respect to the axial air flow produced by the propeller.

Hub 30 is provided with a cylindrical co-axial extension 38 extending towards the back end wall 2 of body 1 from the air propeller blades 31 and carrying at its periphery adjacent the front edge of the extension a plurality of centrifugal blades 39 which are flat and radially disposed in planes going through the axis of rotation of the propeller.

The radial length of the blade 39 is at the most equal to ⅕ the length of the propeller blades 31 from the periphery of hub 30. Thus, the tips of blades 39 are radially inwardly spaced from the deflector plates 33. Moreover, the plane of rotation of the centrifugal blades 39 is forwardly offset with respect to the plane of rotation of deflector plates 33.

A shield 40, of curved cross-section, is carried by body 1 and extends rearwardly of end wall 2 at the bottom portion thereof. Shield 40 is reinforced by framework 41 and provides a cylindrical surface co-axial with air propeller 29 and slightly radially outwardly spaced from the tips 32 of blades 31. Shield 40 extends through an angle of about 90 degrees.

A shroud 42 surrounds the air propeller 29 and is carried by shield 40 at the back end thereof and by longitudinally extending tie bolts 43, so that the shroud 42 extends in the plane of the air propeller 29 and is spaced from the back end wall 2 of body 1, so as to define therewith a ring-like opening 44 for the escape of air all around, except in the zone of the shield 40.

The shroud 42 has such a width and is so disposed with respect to air propeller 29 that the deflector plates 33 are exposed within the ring-like opening 44. Thus, the shroud terminates rearwardly of the deflector plates.

A ring-shaped deflector plate member 45 is disposed within the ring-like opening 44 in a plane parallel with the plane of shroud 42 and spaced forwardly from the same. The ring-shaped deflector plate member 45 is secured firmly in position by means of the tie bolts 43 and by having its ends secured to shield 40.

The radially inner circular edge 46 of plate mmeber 45 is spaced radially outwardly from the surface of hub extension 38 and the latter extends through the central hole defined by plate member 45 to protrude on both sides of the latter.

The centrifugal blades 39 are disposed on the side of the deflector plate member 45 opposite from that of the air propeller 29 and its deflector plates 33.

A disc-shaped deflector plate member 47 is secured by tie bolts 43 and shield 40 in a position between the ring-shaped deflector plate member 45 and the end wall 2 of body 1 and spaced from the forward free end of extension 38 and centrifugal blades 39.

Disc member 47 is in the general plane of the end wall 2 but is slightly inclined to the axis of body 1, so that the longitudinal distance between the two deflector plate members 45 and 47 will be a maximum in a zone diametrically opposed from shield 40. Disc-shaped member 47 surrounds and is secured to tube 17 housing the transmission shaft.

The forwardly directed axial flow of air generated by the air propeller 29 is deflected and diffused radially outwardly through the annular opening 44 on the sides as well as on top of body 1, except that it is prevented from hitting the ground by shield 40.

The treating or insecticide liquid is injected under pressure into the radially flowing air stream by means of nozzles 48 connected to the outer ends of longitudinally extending branch pipes 49 all around the ring opening 44, said pipes 49 being rigidly secured and connected to two manifold pipes 50 extending co-axially of the shaft of the propeller adjacent back end wall 2 and each for approximately half a circle.

The manifold pipes 50 are fed by supply pipes 51 extending longitudinally on each of body 1 and into the engine compartment 6 and each provided with an electric solenoid-operated cut-off valve 52 and a manometer 53. The pipes 51 are connected to a manifold 54, the inlet of which is connected to the outlet of a pump 55 operated by a belt and pulley drive driven by the internal combustion engine 13.

The inlet of pump 55 is connected through filter 56 and three-way valve 57 to the bottom of reservoir 5 by pipe 58. Three-way valve 57 is manually operated and has a branch intake pipe 59 adapted to be connected to a flexible hose for sucking water from a natural body of water at a lower level than the machine of the invention.

A pipe 60 is also connected to manifold 55 and is provided with a manually operated gate valve 61. Pipe 60 is in communication with a small tank 62 secured to partition 4 near the top of the reservoir 5 and communicating with the supply pipe 26 of the perforated pipe 25 located in basket 23.

Pipe 26 is connected to a T 63, one opening of which is normally closed by plug 64 and serving to gain access to the tank 62. A box 65 carrying the control electric switches of solenoid valves 52 is fitted at the end of a flexible tube 66 housing the wires for said switches.

In practice, the machine is used as follows: the reservoir 5 can be filled by a source of water under pressure through opening 21. Then, basket 23 is replaced and filled with the powdered insecticide 24. The engine 13 is started, thereby actuating paddles 27 and recirculating the water within the reservoir 5 through outlet pipe 58, three-way valve 57 positioned as shown in FIGURE 5, filter 56, pump 55, pipe 60, tank 62 and supply pipe 26 to thereby wet the powdered material and entrain the same within the water in reservoir 5 where it is thoroughly mixed by the paddles 27.

After the powdered insecticide has been thoroughly mixed with the water in reservoir 5, gate valve 61 is closed to stop recirculation of the water through tank 62 and the latter remains full of water.

The machine hitched to tractor is towed to the area where foliage is to be sprayed or dusted.

The nozzles 48 are operated by opening the solenoid valves 52, the latter being controlled from the driver's seat through the electric switches housed in box 65, carried by the end of flexible tube 66 which is long enough so that the box 65 is accessible to the driver on the tractor seat. The valves 52 are operated to thereby cause a spray of liquid insecticide to be fed into the radial air blast issuing from the ring opening 44 at the back of the machine.

Whenever it is desired to replenish the reservoir 5 with water and that no available source of water under pressure is nearby, the three-way valve 57 is manually turned to connect the intake of the pump 55 to the branch pipe 59 and the latter is provided with an intake hose to fetch water from a natural body of water or the like. The gate valve 61 is open and the reservoir 5 is filled through reserve tank 62 and supply pipe 26.

The deflector plates 33 secured to the tips 32 of the blades 31 of the air propeller 29, form a second stage for the air compressor unit as they cause the outward radial portion of the axial flow of air generated by the blades 31 to be deflected radially outwardly, the axially flowing air impinging unto the radially outer surface of said deflector blades 33, so as to be deflected immediately downstream from shroud 42 as a radially outwardly directed air flow. The deflection is further assisted by annular deflector plate member 45. The remaining axial flow of air closer to the hub moves through annular plate 45 and is deflected radially outwardly by the second disc-shaped deflector plate member 47. The radial centrifugal blades 39 on extension 38 exert a centrifugal force on the air moving axially along the extension 38 and prevents turbulence and assists in the deflecting of the air radially outwardly along the disc-shaped deflector plate 47. The latter being inclined causes a greater proportion of the radial air flow to be discharged through the upper zone than through the lower side zones of ring-like opening 44.

This arrangement results in a greater efficiency of the air propelling means in that the same power engine will produce a radial air flow having a greater speed so as to spray the insecticide at a greater distance than conventional spraying machines of the same type and, moreover, the overall propeller assembly is much shorter in length than in conventional machines, this propeller assembly starting from the back wall 2 and terminating at the rear free edge of shroud 42.

The machine of the invention has also a lower center of gravity than conventional machines, because the wheel axle extends directly through the cylindrical body 1. Tube 17, housing the transmission shaft sections together with the universal joint 16, provides complete protection for the latter and serves as a reinforcement member for the reservoir portion 5 of body 1 and yet enables easy access to the universal joint 16 through opening 19.

As previously noted, the tank 62 in the normal use of the machine will always contain a reserve of liquid which can be allowed to flow back into the pump when starting the same to prime said pump. Tank 62 is disposed at a higher level than the pump. Moreover, the three-way valve 57 and its branch pipe 59 enable to fill the reservoir 5 with water from a natural body of water at a lower level than the reservoir.

Finally, the solenoid valves 52 may be conveniently operated by the operator while on the tractor seat. Moreover, the dials for the engine and manometers 53 are all normally located on the front end wall 3 of body 1 so as to be easily visible by the operator of the machine while seated on the tractor.

While a preferred embodiment in accordance with the invention has been illustrated and described, it is understood that various modifications may be resorted to without departing from the scope of the appended claims.

What I claim is:

1. An axial flow air propeller comprising a hub and radial blades and deflector plates carried by said blades lying in a plane parallel to the axis of rotation of said propeller and inclined radially inwardly in the direction of the blade leading edge to deflect radially outwardly at least part of the air moved axially by said blades, said hub having a downstream cylindrical extension and radial centrifugal flat blades secured to and outwardly projecting from said extension and lying in planes going through the axis of rotation of said propeller.

2. An air propeller as claimed in claim 1, wherein said deflector plates protrude from the trailing edge of said blades and are disposed near the tip of said blades.

3. An air propeller as claimed in claim 2, further including a reinforcing web for each plate extending in a plane generally parallel to the plane of rotation of said propeller.

4. An air propeller as claimed in claim 3, wherein said web merges with the tip of the associated blade and with the outer edge of the associated deflector plate.

5. An air propeller as claimed in claim 3, wherein said web makes substantially a right angle with said deflector plate and the portion of the latter downstream of said web is wider than the portion of said deflector plate upstream of said web with respect to the axial air flow produced by said propeller.

6. An air propeller as claimed in claim 1, wherein said centrifugal flat blades have a radial length at the most 1/5 the length of said radial blades from the periphery of said hub.

References Cited

UNITED STATES PATENTS

| | | | |
|---|---|---|---|
| 2,026,689 | 1/1936 | Leinweber | 170—170 |
| 2,027,050 | 1/1936 | Leinweber | 170—170 |

EVERETTE A. POWELL, Jr., *Primary Examiner.*